United States Patent [19]

Müller

[11] Patent Number: 4,597,582
[45] Date of Patent: Jul. 1, 1986

[54] FLOCKED FIBER SEAL FOR ROLLING BEARINGS

[75] Inventor: Heinrich Müller, Stuttgart, Fed. Rep. of Germany

[73] Assignee: SKF GmbH, Schweinfurt, Fed. Rep. of Germany

[21] Appl. No.: 741,870

[22] Filed: Jun. 6, 1985

[30] Foreign Application Priority Data

Jun. 7, 1984 [DE] Fed. Rep. of Germany ... 8417328[U]

[51] Int. Cl.[4] .................. F16J 15/453; F16J 15/34; F16C 33/80
[52] U.S. Cl. .................................. 277/53; 277/50; 277/96.1; 277/96.2; 384/480; 384/482
[58] Field of Search .................... 277/47–50, 277/53, 81 R, 96, 96.1, 96.2; 384/480, 481, 482, 477

[56] References Cited

U.S. PATENT DOCUMENTS

| | | | |
|---|---|---|---|
| 885,032 | 4/1908 | DeFerranti | 277/53 X |
| 2,590,422 | 3/1952 | Large | 277/53 |
| 3,658,396 | 4/1972 | Taylor | 277/53 X |
| 4,265,455 | 5/1981 | Lundgren | 277/53 |
| 4,269,420 | 5/1981 | Persson | 277/53 |

FOREIGN PATENT DOCUMENTS 526125 9/1940 United Kingdom ................. 277/53

Primary Examiner—Robert S. Ward
Attorney, Agent, or Firm—Eugene E. Renz, Jr.

[57] ABSTRACT

A seal for roller bearings having inner and outer rings, especially for bearings in electrical machines, comprising at least two sealing disks spaced a certain distance apart on one or both sides of the rolling elements between the rings, one of said sealing disks being attached to one of the bearing rings and with its free end engaging in an annular groove in the other bearing ring, and where the gap between the disks is sealed by flock fibers, characterized in that the one sealing disk, on its free edge near the annular groove, has flock fibers projecting perpendicularly from its surfaces, which fibers are arranged to make slight frictional contact with the surfaces of the annular groove and with the opposite lateral surface of the other sealing disk said other sealing disk being slotted and nonrotatably mounted in the annular groove and having, on the lateral surface facing the sealing disk, a layer of flock fibers, the free ends of which are in contact with the sheet metal part of the sealing disk.

2 Claims, 1 Drawing Figure

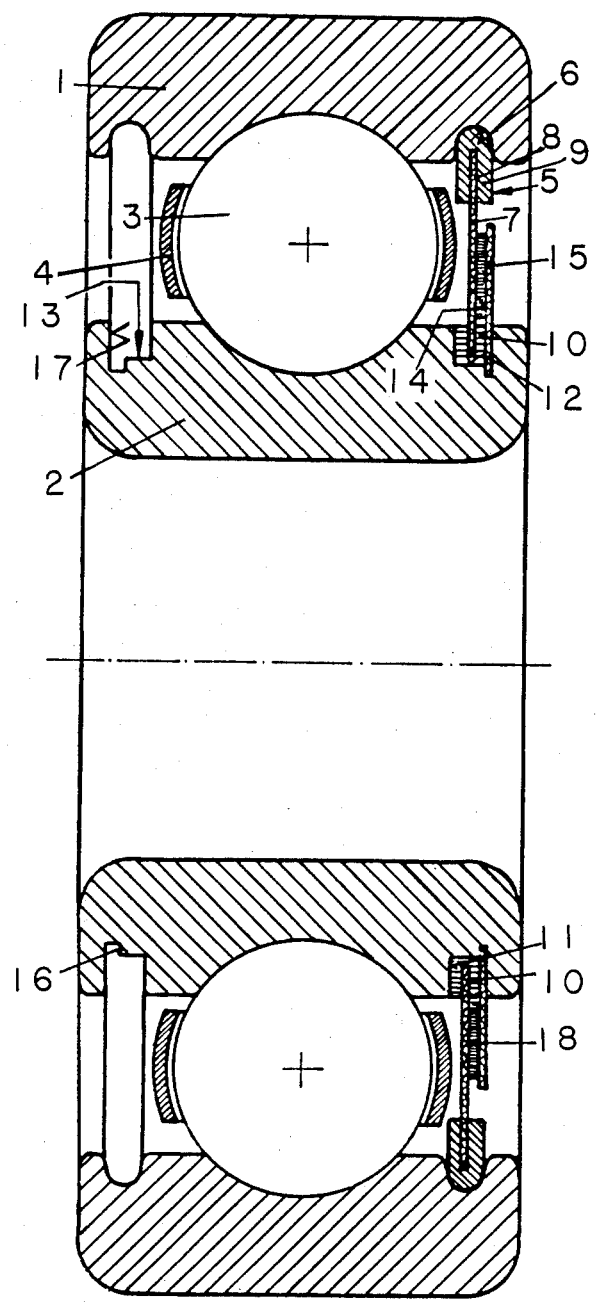

FLOCKED FIBER SEAL FOR ROLLING BEARINGS

BACKGROUND OF THE INVENTION

The present invention relates to seals for rolling bearings and particularly to bearings used in electrical apparatus. The seal of the present invention is characterized by novel features of construction and arrangement comprising at least two sealing disks disposed at a predetermined spaced-apart relation between the rings of the bearing providing a seal at least at one axial end of the bearing assembly. One of the sealing disks is secured to one of the bearing rings and with its free terminal end engaged in an annular groove in the other bearing ring. The gap between the disks is sealed by a plurality of closely spaced flocked fibers.

Swiss Pat. No. 273,178 shows a seal for a bearing assembly comprising a pair of sealing disks spaced apart a small axial distance on both sides of a ball bearing wherein one of the disks is attached to the outer ring and the other to the inner ring. The sealing effect of this prior known gap-type seal is relatively small.

Another seal of this general type is shown in West German Pat. No. 2,313,234. The seal shown in this patent seals the space between the bearing rings and has a free terminal end portion which engages in an annular groove in the opposite bearing ring and wherein one of the opposing surfaces of the disks is coated with relatively short, flexible and essentially axially directed flocked fibers. This prior known sealing arrangement has a relatively good sealing effect despite the relatively low frictional losses.

SUMMARY OF THE INVENTION

With the foregoing in mind, it is an object of the present invention to provide an improved seal for rolling bearings which ensures an effective seal against ingress of foreign matter such as dirt and water from outside the bearing and is effective to provide such a seal even at high speeds and which also ensures lubricant is retained in the bearing against leakage. The seal assembly comprises first and second annular sealing disks. One sealing disk has flocked fibers projecting perpendicularly from opposing circumferentially extending surfaces adjacent its free terminal edge remote from the circumferentially extending seating end of the disk and also fibers projecting perpendicularly on side face confronting the second disk. The fibers are designed to make slight frictional contact with the surface of the second annular groove adjacent the free terminal edge of the first disk and with a lateral surface of the second sealing disk by which it confronts. The second sealing disk is slotted and is non-rotatably mounted in the annular groove. The second sealing disk has a plurality of closely spaced flocked fibers on the lateral face thereof adjacent the first sealing disk which contact the opposing confronting circumferentially extending side face of the first sealing disk and in this manner provides somewhat of a labyrinth seal preventing egress of foreign matter such as dirt and retaining lubricant in the annular space between the rings for lubricating the rolling elements contained therein. The seal provided is operative to prevent ingress of foreign matter including water even when the bearing is at rest.

In accordance with a further specific feature of the present invention, the first sealing disk has a circumferentially extending cover surrounding the outer peripheral edge thereof which seats in an annular groove in one of the rings to provide a tight sealing connection between the bearing ring and the first sealing disk.

DESCRIPTION OF THE DRAWING

These and other objects of the present invention are hereinafter more fully set forth with reference to the accompanying drawing wherein the single figure is a transverse sectional view showing the details and arrangement of the disk in a single-row ball bearing assembly.

DESCRIPTION OF THE PREFERRED EMBODIMENT

Referring now to the drawing, there is illustrated a seal assembly in accordance with the present invention installed in a single-row ball bearing having spaced outer and inner annular ring members 1 and 2 respectively and a plurality of balls 3 in the annular space between the rings which are circumferentially spaced apart by a conventional cage 4. In the present instance a seal assembly S is adapted to be mounted on opposite axial ends of the bearing assembly to provide an effective seal which prevents ingress of foreign matter and which retains lubricant in the space occupied by the balls 3.

The seal assembly S comprises a first annular sealing disk 5 which, in the present instance, is seated at its outer circumferential edge in an annular groove 6 formed in the bore 1a of the outer ring 1. Sealing disk 5 is preferably a sheet metal part 7 and mounts at its outer peripheral edge a plastic cover 9 of U-shaped configuration, the cover 9 as illustrated closely conforming to the shape of the annular groove 6 to provide a tight seating of the sealing disk regardless of whether the outer ring is rotating or not. As illustrated, the inner free terminal edge of the first sealing disk 5 projects into an annular groove 13 formed in the bore 2a of the inner ring 2 which as illustrated is of stepped configuration and includes circumferentially extending lateral and base surfaces 11 and 12 respectively. A second slinger disk 15 is mounted in a circumferentially extending recess 16 in the annular groove 13 and rests against a circumferentially extending lateral surface 17 of the annular groove 13. In the present instance as illustrated the outer peripheral edge of the slinger disk 15 terminates just short of the cover 5 to define relatively large confronting circumferentially extending faces 5a and 15a between the first sealing disk 5 and slinger disk 15. The mounting arrangement described positions the first sealing disk 5 and slinger disk 15 in generally parallel array and provides a predetermined small axial distance between the confronting faces 5a and 15a.

The sealing disk 5 is coated with a plurality of relatively short flexible flocked fibers 10 which are embedded in a suitable support material such as a synthetic resin or the like and covers the opposing faces of the sealing disk 5 adjacent the inner free terminal edge thereof. In this manner, the flocked fibers 10 make slight frictional contact with the lateral surface 11 and the base surface of the annular groove 13 and also with the confronting surface 15a of the slinger disk 15 in the region of the annular groove 13. The circumferentially extending face 15a of the slinger disk 15 is also provided with a plurality of closely spaced flocked fibers which project perpendicularly to engage with slight frictional contact the confronting face 5a of the first sealing disk 5 and thereby seal the gap G between the confronting faces 5a and 15a of the first sealing disk 5 and slinger disk 15 respectively.

Even though a particular embodiment of the invention has been illustrated and described herein, it is not intended to limit the invention and changes and modifications may be made therein within the scope of the following claims. For example, the seal has useful application in other types of bearing assemblies such as cylindrical roller bearings, conical roller bearings, etc. Additionally, the grooves in which the sealing disks engage may be the reverse of the illustrated. Thus, the annular groove 13 can be formed in the bore of the outer ring and the sealing disk 5 can be secured to the inner ring and the sealing disk 15 secured to the outer ring.

What is claimed is:

1. A seal for roller bearings having inner and outer rings, especially for bearings in electrical machines, comprising at least two sealing disks spaced a certain distance apart on one or both sides of the rolling elements between the rings, one of said sealing disks being attached to one of the bearing rings and with its free end engaging in an annular groove in the other bearing ring, and where the gap between the disks is sealed by flock fibers, characterized in that the one sealing disk (5), on its free edge near the annular groove (13), has flock fibers (10) projecting perpendicularly from its surfaces, which fibers are arranged to make slight frictional contact with the surfaces (11,12) of the annular groove (13) and with the opposite lateral surface (14) of the other sealing disk (15), said other sealing disk (15) being slotted and nonrotatably mounted in the annular groove (13) and having, on the lateral surface facing the sealing disk (5), a layer of flock fibers (18), the free ends of which are in contact with the sheet metal part (7) of the sealing disk (5).

2. A seal according to claim 1, characterized in that the sealing disk (5), which, with its free end, engages with play in the annular groove (13) of the one bearing ring (2), has a plastic covering (9) on the edge by which it is attached and is installed by means of this covering in an annular groove (6) in the other bearing ring (1).

* * * * *